United States Patent
Ning

(10) Patent No.: US 9,329,636 B2
(45) Date of Patent: May 3, 2016

(54) INFORMATION PROCESSING METHOD AND ELECTRONIC DEVICE

(71) Applicants: Beijing Lenovo Software Ltd., Beijing (CN); Lenovo (Beijing) Limited, Beijing (CN)

(72) Inventor: Kejun Ning, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 106 days.

(21) Appl. No.: 14/495,329

(22) Filed: Sep. 24, 2014

(65) Prior Publication Data

US 2015/0261256 A1     Sep. 17, 2015

(30) Foreign Application Priority Data

Mar. 17, 2014   (CN) .......................... 2014 1 0099515

(51) Int. Cl.
*G06F 1/16* (2006.01)

(52) U.S. Cl.
CPC .............. *G06F 1/166* (2013.01); *G06F 1/1626* (2013.01); *G06F 1/1681* (2013.01)

(58) Field of Classification Search
CPC .............. G06F 1/16; G06F 1/166; H05K 7/00
See application file for complete search history.

(56) References Cited

U.S. PATENT DOCUMENTS

| 9,125,289 B2* | 9/2015 | Vahid | G06F 1/1632 |
| 2005/0052831 A1* | 3/2005 | Chen | G06F 1/1616 |
|  |  |  | 361/679.11 |
| 2012/0106047 A1* | 5/2012 | Chu | G06F 1/166 |
|  |  |  | 361/679.01 |
| 2015/0055012 A1* | 2/2015 | Zheng | G06F 1/1601 |
|  |  |  | 348/373 |
| 2015/0055285 A1* | 2/2015 | Zheng | G06F 1/1656 |
|  |  |  | 361/679.26 |

* cited by examiner

*Primary Examiner* — Lisa Lea Edmonds

(74) *Attorney, Agent, or Firm* — Schwegman, Lundberg & Woessner, P.A.

(57) ABSTRACT

The present disclosure provides an information processing method and an electronic device. The electronic device comprises a first body, a second body and a rotatable connection member. The first body is connected with the second body by the rotatable connection member. The rotatable connection member has a first using state corresponding to a first rotation damping, and a second using state corresponding to a second rotation damping. In the case the rotatable connection member is in the first using state, the first body can be rotated with respect to the second body at the first rotation damping. The rotatable connection member is changed from the first using state to the second using state to keep a fixed angle between the first body and the second body in the case that a first instruction is received. The second rotation damping is greater than the first rotation damping.

17 Claims, 4 Drawing Sheets

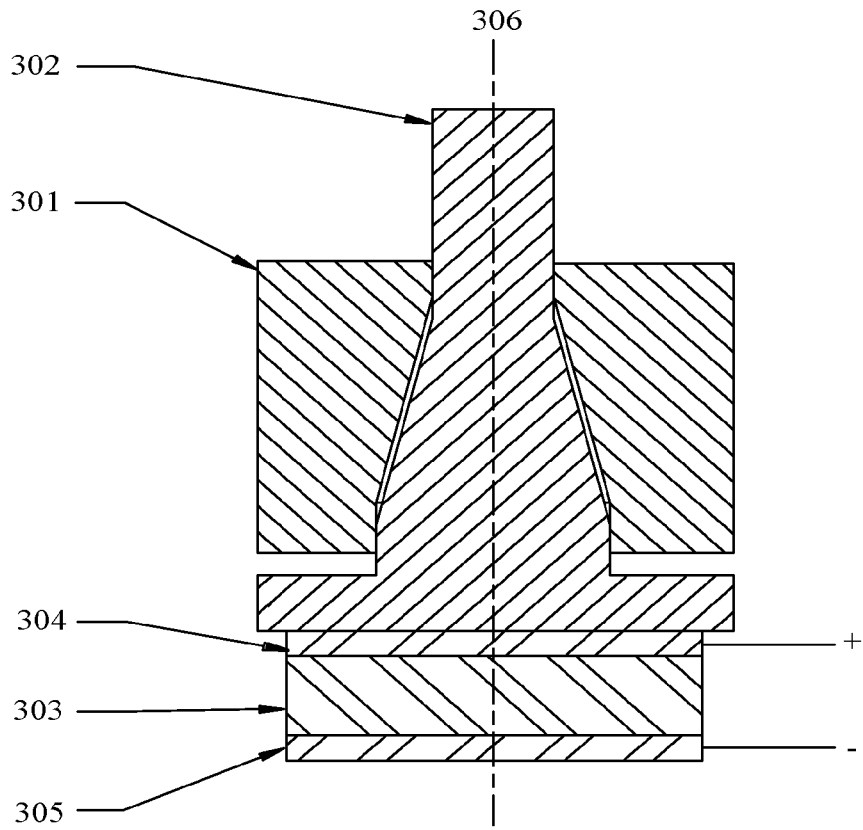

Fig. 3 (c)

| in the case that the rotatable connection member is in the first using state, the first body is rotated with respect to the second body at the first rotation damping. |
|---|

401

| the rotatable connection member is changed from the first using state to the second using state to keep a fixed angle between the first body and the second body in the case that receiving a first instruction during the first body rotating with respect to the second body; wherein the second rotation damping corresponding to the second using state is greater than the first rotation damping corresponding to the first using state. |
|---|

INFORMATION PROCESSING METHOD AND ELECTRONIC DEVICE

CROSS-REFERENCE TO RELATED APPLICATION

This application claims the benefit of Chinese Patent Application No. 201410099515.1 filed on Mar. 17, 2014 in the State Intellectual Property Office of China, the whole disclosure of which is incorporated herein by reference.

BACKGROUND

1. Field

The present disclosure relates to information processing technology, and more particular, to an information processing method applicable in an electronic device.

2. Related Art

Electronic devices, such as desktop computers, notebook PCs and PADs, have been widely used in daily life. PAD is very popular today since it occupies a smaller space. FIG. 1 shows a schematic view of a structure of a PAD. As shown in FIG. 1, the PAD is placed at a certain angle by means of a rotation damping coefficient (a rotation damping) between a rotation shaft 2 provided inside of the PAD and connected with a supporting portion 1 and a rotation shaft shell (connected to a housing of the PAD) wrapping around the rotation shaft 2. If the rotation damping coefficient is too small, a frictional resistance generated is not sufficient for retaining the PAD at a desired angle. If the rotation damping coefficient is too large, a large damping makes it difficult to rotate the PAD when the angle is needed to be changed, though the PAD can be retained at the desired angle.

SUMMARY

Embodiments of the present disclosure provide an information processing method and an electronic device.

Aspects of the embodiments of the present disclosure are realized as follows.

The embodiments of the present disclosure provide an electronic device. The electronic device comprises a first body, a second body and a rotatable connection member. The first body is connected with the second body by the rotatable connection member, the rotatable connection member comprises a first using state corresponding to a first rotation damping and a second using state corresponding to a second rotation damping, and the second rotation damping is greater than the first rotation damping. The first body can be rotated with respect to the second body at the first rotation damping in the case that the rotatable connection member is in the first using state. The rotatable connection member is changed from the first using state to the second using state to keep a fixed angle between the first body and the second body in that case that receiving a first instruction during the first body rotating with respect to the second body.

In the above aspect, the first instruction is an instruction generated in the case that a rotation angle between the first body and the second body is greater than a predetermined angle. Or, the first instruction is an instruction generated in the case that a time duration during which the angle between the first body and the second body is kept at a first angle, is longer than a preset time threshold. Or, the first instruction is an instruction generated in the case that a first operation of a user is detected. The first operation comprises an operation of changing a usage mode of the electronic device.

In the above aspect, the rotatable connection member comprises a rotation shaft, and the first using state and the second using state correspond to different diameters of the rotation shaft.

In the above aspect, in the case that the rotation shaft is made of a piezoelectric material, the first instruction is an instruction to change an intensity of electric field applied to the piezoelectric material.

In the above aspect, if an angle between the first body and the second body is kept fixed, the rotatable connection member is changed from the second using state to the first using state in the case that a second instruction is received.

In the above aspect, the second instruction is an instruction generated in the case that a second operation of a user is detected, and the second operation comprises an operation of changing a usage mode of the electronic device, or the second instruction is an instruction generated in the case that a time duration during which the angle between the first body and the second body is kept at a second angle, is longer than a preset time threshold.

In the above aspect, the first body comprises a display unit, and the second body is configured to support the first body.

The embodiments of the present disclosure also provide an information processing method. The method comprises:

rotating, by a first body of an electronic device and at a first rotation damping, with respect to a second body of the electronic device in the case that a rotatable connection member which connects the first body and the second body is in a first using state;

changing the rotatable connection from the first using state to a second using state to keep a fixed angle between the first body and the second body, in the case that a first instruction is received during the first body rotating with respect to the second body;

wherein a second rotation damping corresponding to the second using state is greater than the first rotation damping corresponding to the first using state.

In the above aspect, the method further comprises:

generating the first instruction in the case that:

a rotation angle between the first body and the second body is greater than a predetermined angle; or a time duration, during which the angle between the first body and the second body is kept at a first angle, is longer than a preset time threshold; or a first operation of a user is detected, wherein the first operation comprises an operation of changing a usage mode of the electron device.

In the above aspect, the rotatable connection member comprises a rotation shaft, and the first using state and the second using state correspond to different diameters of the rotation shaft.

In the above aspect, the rotation shaft is made of a piezoelectric material, and the method further comprises generating the first instruction in the case that a change of an intensity of electric field applied to the piezoelectric material is detected.

In the above aspect, after keeping a fixed angle between the first body and the second body, the method further comprises changing the rotatable connection member from the second using state to the first using state in the case that a second instruction is received.

In the above aspect, the method further comprises:

generating a second instruction in the case that a second operation of a user is detected, wherein the second operation comprises an operation of changing a usage mode of the electronic device; or generating a second instruction in the case that a time duration, during which the angle between the first body and the second body is kept at a second angle, is longer than a preset time threshold.

In the above aspect, the method further comprises using the second body to support the first body on a surface, wherein the first body comprises a display unit.

BRIEF DESCRIPTION OF THE DRAWINGS

FIG. 4 is a schematic view of a flow chart of a first embodiment of an information processing method in accordance with the present disclosure.

DETAILED DESCRIPTION OF EMBODIMENTS

Preferred embodiments of the present disclosure will be described hereinafter in detail with reference to the attached drawings. The following descriptions of the preferred embodiments are only intended to illustrate the present disclosure and should not be construed as limiting to the embodiment set forth herein.

In respective embodiments of the electronic devices and the information processing methods in accordance with the present disclosure, the referred electronic devices may be PADs, mobile terminals, notebook PCs and the like.

Figure 1:
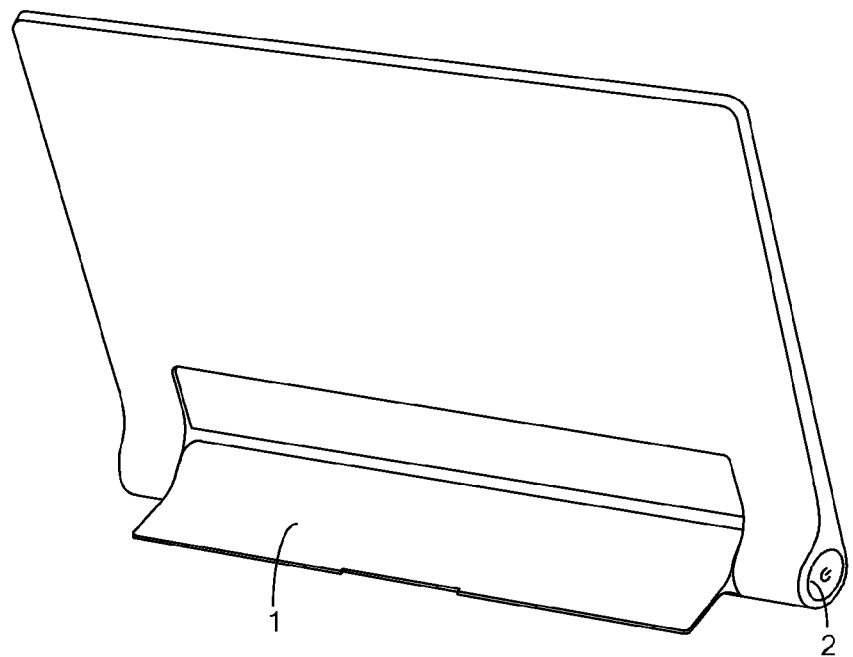
FIG. 1 is a schematic view of a structure of a PAD.
Figure 2:
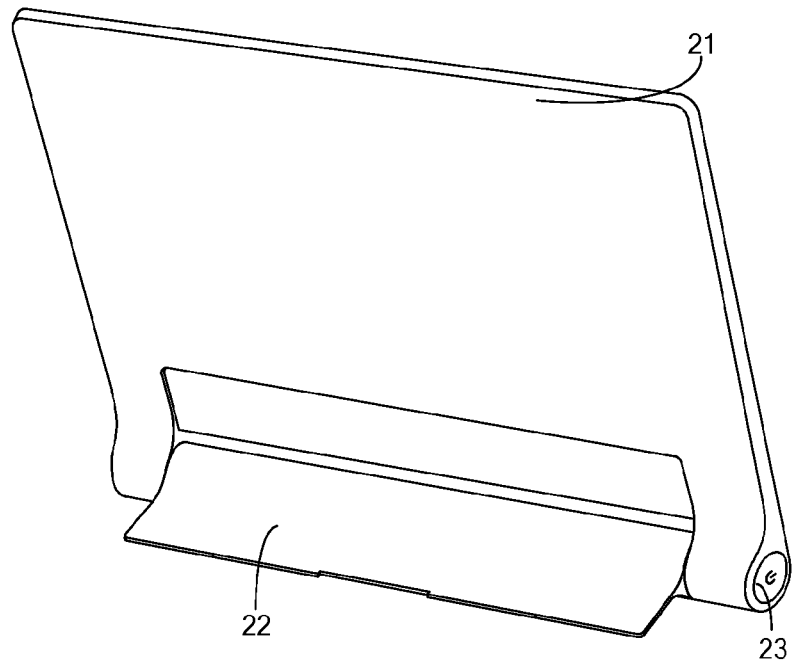
FIG. 2 is a schematic view of a component structure of a first embodiment of an electronic device in accordance with the present disclosure.

FIG. 2 is a schematic view of a component structure of a first embodiment of the electronic device in accordance with the present disclosure. As shown in FIG. 2, the electronic device comprises a first body 21, a second body 22 and a rotatable connection member 23. The first body 21 is connected with the second body 22 by the rotatable connection member 23. The rotatable connection member 23 has a first using state corresponding to a first rotation damping and a second using state corresponding to a second rotation damping. In the case that the rotatable connection member 23 is in different using states, angles between the first body 21 and the second body 22 are different from each other, so that the electronic device is in different usage modes. The first body 21 includes a display unit, and the second body 22 may be a supporting portion configured for supporting the first body 21. The electronic device may be presented in different usage modes due to different angles between the first body 21 and the second body 22. In the case that there is an angle formed between the first body 21 and the second body 22, the second body 22 is used for supporting the first body 21.

The first body 21 can be rotated with respect to the second body 22 at the first rotation damping in the case that the rotatable connection member 23 is in the first using state.

The rotatable connection member 23 is changed from the first using state to the second using state to keep a fixed angle between the first body 21 and the second body 22 in the case that receiving a first instruction during the first body rotating with respect to the second body. The second rotation damping corresponding to the second using state is greater than the first rotation damping corresponding to the first using state.

A rotation angle is detected during rotation, and the first instruction is generated in the case that the rotation angle between the first body and the second body is greater than a predetermined angle, or a time duration during which the angle between the first body and the second body is kept at a first angle is longer than a preset time threshold, or a first operation of a user is detected. The first operation comprises an operation of changing a shape of the electronic device, such as rotating the second body 22 while the position of the first body 21 is kept unchanged or rotating the first body 21 while the position of the second body 22 is kept unchanged.

In other words, the first instruction may be an instruction generated in the case that the rotation angle is greater than the predetermined angle range, that the time duration, during which the angle between the first body and the second body is kept at the first angle, is longer than the preset time threshold or that the first operation of the user is detected.

In a preferred embodiment of the present disclosure, if the angle (a second angle) between the first body 21 and the second body 22 is kept fixed, the time duration during which the angle between the first body 21 and the second body 22 is kept at the second angle is detected, and the rotatable connection member 23 is changed from the second using state to the first using state in the case that the detected time duration is within the preset time threshold; or if the second angle between the first body 21 and the second body 22 is kept fixed, the rotatable connection member 23 is changed from the second using state to the first using state in the case that the second operation of the user is detected. The second operation may be an operation of changing the usage modes or configuration of the electronic device, such as rotating the second body 22 while the position of the first body 21 is kept unchanged or rotating the first body 21 while the position of the second body 22 is kept unchanged.

Therefore, in the first embodiment of the electronic device of the present disclosure, the electronic device is presented in different usage modes by means of different rotation damping of the rotatable connection member. In this way, the usage mode of the electronic device can be changed without requiring a labored manual operation. The user's operation is simplified and the user's experience is improved. Furthermore, the time duration during which the electronic device is in a certain usage mode can be lengthened by increasing the rotation damping.

FIG. 3(a) is a schematic view of a component structure of a second embodiment of the electronic device in accordance with the present disclosure. As shown in FIG. 3(a), the electronic device comprises a first body 31, a second body 32 and a rotatable connection member 33. The first body 31 is connected with the second body 32 by the rotatable connection member 33. The rotatable connection member 33 has a first using state corresponding to a first rotation damping, and a second using state corresponding to a second rotation damping. In the case that the rotatable connection member 33 is in different using states, angles between the first body 31 and the second body 32 are different from each other, so that the electronic device is presented in different usage modes. The first body 31 includes a display unit, and the second body 32 may be a supporting portion configured for supporting the first body 31. The electronic device may be presented in different usage modes due to different angles between the first body 31 and the second body 32. In the case that there is an angle formed between the first body 31 and the second body 32, the second body 32 is used for supporting the first body 31. In the case that the electronic device is not needed to be presented in any usage mode, the second body 32 is received within a groove 34 provided for the second body 32 and provided on the first body 31.

The first body 31 can be rotated with respect to the second body 32 at the first rotation damping in the case that the rotatable connection member 33 is in the first using state.

The rotatable connection member 33 is changed from the first using state to the second using state to keep a fixed angle between the first body 31 and the second body 32 in the case that receiving a first instruction during the first body 31 rotating with respect to the second body 32. The second rotation damping corresponding to the second using state is greater than the first rotation damping corresponding to the first using state.

The rotatable connection member may be a rotation shaft cooperating with piezoelectric material/made of piezoelectric materials. By means of properties of the piezoelectric materials, the rotation damping of the rotation shaft is changed by changing an intensity of electric field applied to the piezoelectric material, so that the electronic device is presented in different usage modes.

Figure 3:
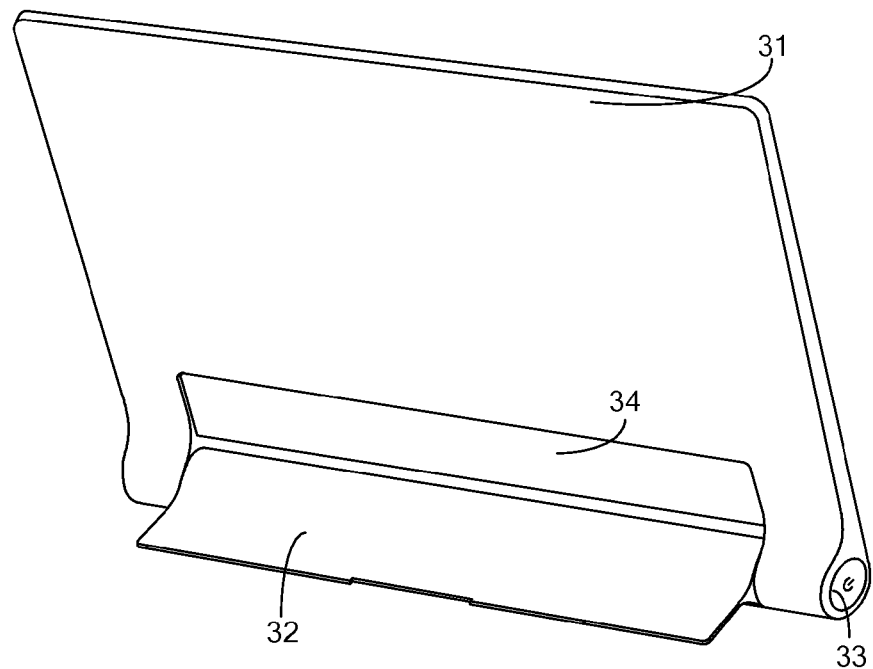
FIG. 3(a) is a schematic view of a component structure of a second embodiment of the electronic device in accordance with the present disclosure.
FIG. 3(b) is a schematic view, in cross-section, of a rotation shaft in a case where an intensity of electric field is increased, in accordance with the present disclosure.
FIG. 3(c) is a schematic view, in cross-section, of the rotation shaft in a case where the intensity of electric field is reduced, in accordance with the present disclosure.
Figure 3:
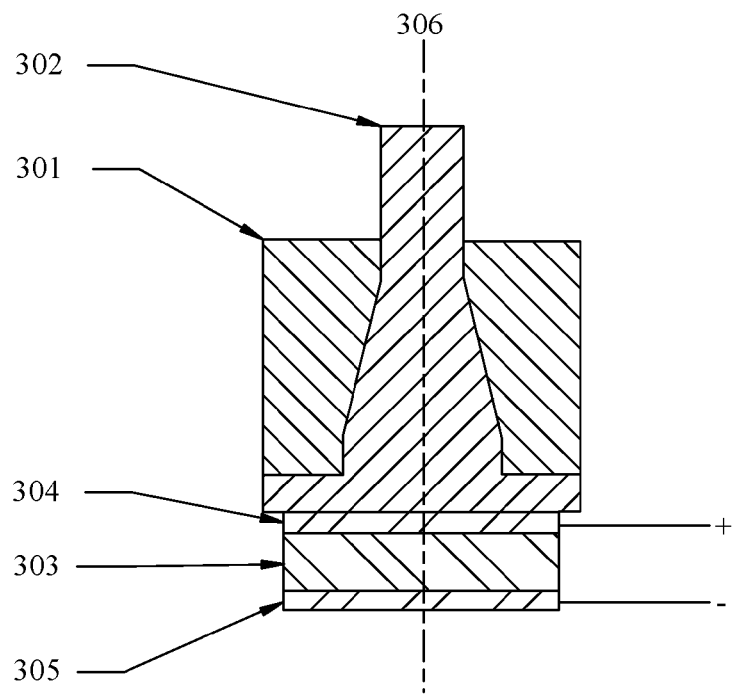

FIG. 3(*b*) is a schematic view, in cross-section, of a rotation shaft in a case where an intensity of electric field is increased, in accordance with the present disclosure, and FIG. 3(*c*) is a schematic view, in cross-section, of the rotation shaft in a case where the intensity of electric field is reduced, in accordance with the present disclosure.

As shown in FIGS. 3(*b*) and 3(*c*), one end of a rotation shaft 302 cooperating with piezoelectric material 303/made of a piezoelectric material 303 is connected with an anode 304 of a power supply, and the other end of the rotation shaft 302 is connected with a cathode 305 of the power supply. A rotation shaft shell 301 wrapping around the rotation shaft 302 is connected with a shell of the electronic device. The rotation shaft 302 is connected with the second body 32, and the cathode 305 of the power supply is connected with the shell of the electronic device.

As shown in FIG. 3(*b*), in the case that the intensity of electric field applied to the rotation shaft 302 cooperating with the piezoelectric material 303/made of the piezoelectric material 303 is increased, the piezoelectric material 303 becomes larger in terms of shape, so that the rotation shaft 302 is upwardly moved along a central axis 306. Thus, a pressure between the rotation shaft shell 301 and the rotation shaft 302 is increased, and as a result, the rotation damping of the rotation shaft 302 is increased. As shown in FIG. 3(*c*), in the case that the intensity of electric field applied to the rotation shaft 302 cooperating with the piezoelectric material 303/made of the piezoelectric material 303 is reduced, the piezoelectric material 303 becomes smaller in terms of shape, so that the rotation shaft 302 is downwardly moved along the central axis 306. Thus, the pressure between the rotation shaft shell 301 and the rotation shaft 302 is reduced, and as a result, the rotation damping of the rotation shaft 302 is reduced. Because of change in the shape of the piezoelectric material 303, the rotation shaft cooperating with the piezoelectric material/made of the piezoelectric material 303 has different diameters in the case that it is in the first and second using states. In a case where the rotatable connection member 33 is the rotation shaft 302, the first instruction may be an instruction to change the intensity of electric field applied to the piezoelectric material.

In the above solution, the specific process to change the rotation damping of the rotation shaft by changing the intensity of electric field can be found from the prior art. Thus, the detailed description is omitted herein.

In a preferred embodiment of the present disclosure, the first instruction may be an instruction generated in the case that the rotation angle is greater than the predetermined angle, that the time duration, during which the angle between the first body and the second body is kept at the first angle, is longer than the preset time threshold or that the first operation of the user is detected. The first operation comprises an operation of changing the shape of the electronic device, such as rotating the second body 32 while the position of the first body 31 is kept unchanged or rotating the first body 31 while the position of the second body 32 is kept unchanged.

In a preferred embodiment of the present disclosure, after keeping the angle (a second angle) between the first body 31 and the second body 32 to be fixed, the time duration during which the angle between the first body 31 and the second body 32 is kept at the second angle is detected, and in the case that the detected duration of time is within the preset time threshold, the rotatable connection member 33 is changed from the second using state to the first using state; or after keeping the second angle between the first body 31 and the second body 32 to be fixed, the rotatable connection member 33 is changed from the second using state to the first using state in the case that the second operation of the user is detected. The second operation may be an operation of changing the usage mode of the electronic device, such as rotating the second body 32 while the position of the first body 31 is kept unchanged or rotating the first body 31 while the position of the second body 32 is kept unchanged.

Therefore, in the second embodiment of the electronic device of the present disclosure, during a certain time duration, the rotation damping can be kept unchanged by continuously applying a constant intensity of electric field to the rotation shaft, so that the electronic device can be retained in a desired usage mode for a long time. Furthermore, the usage mode of the electronic device can be easily changed by changing the applied intensity of electric field, without requiring a labored manual operation. The user's operation is simplified and the user's experience is improved.

A first embodiment of an information processing method according to the present disclosure is applied in the electronic device. The electronic device comprises a first body, a second body and a rotatable connection member. The first body is connected with the second body by the rotatable connection member. The rotatable connection member has a first using state corresponding to a first rotation damping and a second using state corresponding to a second rotation damping. In the case that the rotatable connection member is in different using states, angles between the first body and the second body are different from each other, so that the electronic device is in different using states. The first body includes a display unit, and the second body may be a supporting portion configured for supporting the first body. The electronic device may be presented in different usage modes due to different angles between the first body and the second body. When there is an angle formed between the first body and the second body, the second body is used for supporting the first body.

FIG. 4 is a schematic view of a flow chart of the first embodiment of the information processing method in accordance with the present disclosure. As shown in FIG. 4, the method comprises:

step 401: in the using state of the rotatable connection member, the first body is rotated with respect to the second body in the first rotation damping;

step 402: the rotatable connection member is changed from the first using state to the second using state to keep a fixed angle between the first body and the second body in the case that receiving a first instruction during the first body rotating with respect to the second body. The second rotation damping corresponding to the second using state is greater than the first rotation damping corresponding to the first using state.

The rotation angle is detected during rotation, and a first instruction generated in the case that the detected rotation angle is greater than a predetermined angle, or that a time duration during which the angle between the first body and the second body is kept at a first angle is longer than a preset time threshold, or that a first operation of a user is detected. The first operation comprises an operation of changing a shape of the electronic device, such as rotating the second body while the position of the first body is kept unchanged or rotating the first body while the position of the second body is kept unchanged.

It should be noted that in the present embodiment, the structure of the referred electronic device can be seen from FIG. 2 and the associated description thereof. Thus, they are omitted herein.

Therefore, in the first embodiment of the method of the present disclosure, the electronic device is presented in different usage modes by means of different rotation damping of the rotatable connection member. In this way, the usage mode of the electronic device can be changed without requiring a labored manual operation. The user's operation is simplified and the user's experience is improved. Furthermore, the time duration during which the electronic device is in a certain usage mode can be lengthened by increasing the rotation damping.

A second embodiment of an information processing method according to the present disclosure is applied in the electronic device. The electronic device comprises a first body, a second body and a rotatable connection member. The first body is connected with the second body by the rotatable connection member. The rotatable connection member has a first using state corresponding to a first rotation damping and a second using state corresponding to a second rotation damping. In the case that the rotatable connection member is in different using states, angles between the first body and the second body are different from each other, so that the electronic device is presented in different usage modes. The first body includes a display unit, and the second body may be a supporting portion configured for supporting the first body. The electronic device may be presented in different usage modes due to different angles between the first body and the second body. In the case that there is an angle formed between the first body and the second body, the second body is used for supporting the first body. In the case that the electronic device is not needed to be in any usage mode, the second body is received within in a groove provided for the second body and provided on the first body.

Figure 5:
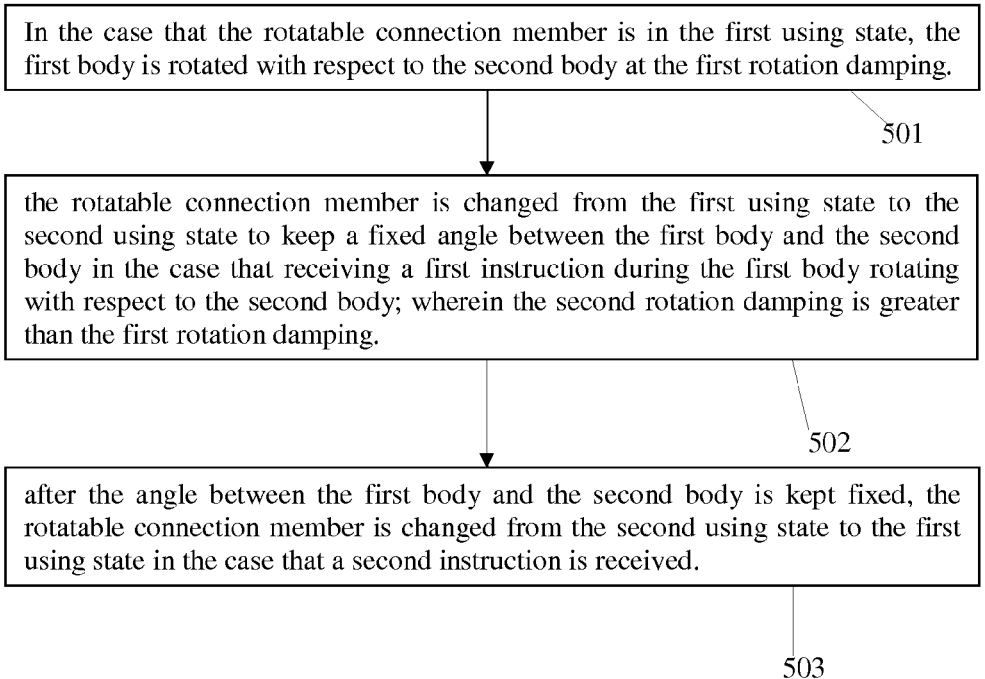
FIG. 5 is a schematic view of a flow chart of a second embodiment of the information processing method in accordance with the present disclosure.

FIG. 5 is a schematic view of a flow chart of the second embodiment of the information processing method in accordance with the present disclosure. As shown in FIG. 5, the method comprises:

step 501: in the using state of the rotatable connection member, the first body is rotated with respect to the second body at the first rotation damping;

step 502: the rotatable connection member is changed from the first using state to the second using state to keep a fixed angle between the first body and the second body in the case that receiving a first instruction during the first body rotating with respect to the second body. The second rotation damping corresponding to the second using state is greater than the first rotation damping corresponding to the first using state.

The rotation angle is detected during rotation, and a first instruction is generated in the case that the detected rotation angle is greater than a predetermined angle, or that a time duration during which the angle between the first body and the second body is kept at a first angle is longer than a preset time threshold, or that a first operation of a user is detected. The first operation comprises an operation of changing a shape of the electronic device, such as rotating the second body while the position of the first body is kept unchanged or rotating the first body while the position of the second body is kept unchanged.

The rotatable connection member may be a rotation shaft cooperating with piezoelectric material/made of piezoelectric materials. By means of properties of the piezoelectric materials, the rotation damping of the rotation shaft is changed by changing an intensity of electric field applied to the piezoelectric material, so that the electronic device is presented in different usage modes. The first instruction may be an instruction to change the intensity of electric field applied to the piezoelectric materials.

In a case where the intensity of electric field is increased, as shown in FIG. 3(b), when the intensity of electric field applied to the rotation shaft cooperating with the piezoelectric material/made of the piezoelectric materials is increased, the piezoelectric material becomes larger in terms of shape, so that the rotation shaft is upwardly moved along a central axis shown in FIG. 3(b). Thus, a pressure between the rotation shaft shell and the rotation shaft is increased, and as a result, the rotation damping of the rotation shaft is increased.

In a case where the intensity of electric field is reduced, as shown in FIG. 3(c), when the intensity of electric field applied to the rotation shaft cooperating with the piezoelectric material/made of the piezoelectric material is reduced, the piezoelectric material becomes smaller in terms of shape, so that the rotation shaft is downwardly moved along the central axis shown in FIG. 3(c). Thus, the pressure between the rotation shaft shell and the rotation shaft is reduced, and as a result, the rotation damping of the rotation shaft is reduced. Because of change in the shape of the piezoelectric material, the rotation shaft cooperating with the piezoelectric material/made of the piezoelectric materials has different diameters in the case that it is in the first and second using states.

In the above solution, the specific process to change the rotation damping of the rotation shaft by changing the intensity of electric field can be found from the prior art. Thus, the detailed description is omitted herein.

Step 503: after the angle between the first body and the second body is kept fixed, the rotatable connection member is changed from the second using state to the first using state in the case that a second instruction is received.

Specifically, after the angle (a second angle) between the first body and the second body is kept fixed, the time duration during which the angle between the first body and the second body is kept at the second angle is detected, and in the case that the time duration detected is within the preset time threshold, the rotatable connection member is changed from the second using state to the first using state; or after the second angle between the first body and the second body is kept fixed, the rotatable connection member is changed from the second using state to the first using state in the case that the second operation of the user is detected. The second operation may be an operation of changing the usage mode of the electronic device, such as rotating the second body while the position of the first body is kept unchanged or rotating the first body while the position of the second body is kept unchanged.

It should be noted that in the present embodiment, the structure arrangement of the referred electronic device can be seen from FIGS. 3(a) to 3(c) and the associated description thereof. Thus the detailed description there is omitted herein.

Therefore, in the second embodiment of the method of the present disclosure, during a certain time duration, the rotation damping can be kept unchanged by continuously applying a constant intensity of electric field to the rotation shaft, so that the electronic device can be retained in a desired usage mode in a long time duration. Furthermore, the usage mode of the electronic device can be easily changed by changing the applied intensity of electric field, without requiring a labored manual operation. The user's operation is simplified and the user's experience is improved.

In the embodiments of the present disclosure, it can be understood that the disclosed apparatus and method may be realized by means of other ways than those described above. The embodiments of the apparatus described above only are illustrative. For instance, division of respective units is only a logical function division. In practice, other suitable divisions may be used herein. For example, a plurality of units or assemblies may be combined or may be integrated into another system. Further, some features may be omitted or may not be carried out. Further, the respective component members illustrated or discussed as above are directly coupled with each other, or communicated with each other via some interfaces. Indirect coupling or communication between respective devices or units may be electrical, physical or be in other forms.

The above units described as individual units may be or may not be physically separated from each other. The respective components presented as function units may be or may not be physical units. They may be provided at the same place or may be distributed on a plurality of network units. Some or all of the units may be selected for achieving the objective solutions of the embodiments of the present disclosure according to actual requirements.

Further, all function units in the embodiments of the present disclosure may be integrated into a single processing unit or may be separately used as respective units, or two or more of the function units in the embodiments of the present disclosure may be integrated into a single unit. The integrated unit may be realized in the form of hardware, or in the form of a combination of hardware and software function units.

One skilled in the art can understand that all or some of the steps realizing the above method embodiments can be carried out by hardware associated with program instructions. Said program instructions may be stored in a computer-readable storage medium. When the program is executed, the steps realizing the above method embodiments are carried out. The storage medium may comprise any medium on which program codes can be stored, such as a portable storage device, a read-only memory (ROM), a random access memory (RAM), a floppy disk or a CD.

It should be noted that the above described embodiments are preferred embodiments of the present disclosure only and are not intended to limit the present disclosure. It would be appreciated by those skilled in the art that various changes and substitutions may be made without departing from the principle and spirit of the disclosure. Such changes and substitutions fall within the scope of the disclosure. Therefore, the scope of the present disclosure is defined by the attached claims.

What is claimed is:

1. An electronic device, comprising:
   a first body;
   a second body; and
   a rotatable connection member;
   wherein the first body is connected with the second body by the rotatable connection member, the rotatable connection member comprises a first using state corresponding to a first rotation damping and a second using state corresponding to a second rotation damping, the second rotation damping is greater than the first rotation damping; the first body is rotatable with respect to the second body at the first rotation damping in the case that the rotatable connection member is in the first using state; and
   wherein the rotatable connection member is changed from the first using state to the second using state to keep a fixed angle between the first body and the second body, in the case that receiving a first instruction during the first body rotating with respect to the second body.

2. The electronic device according to claim 1, wherein the first instruction is an instruction generated in the case that:
   a rotation angle between the first body and the second body is greater than a predetermined angle.

3. The electronic device according to claim 1, wherein the first instruction is an instruction generated in the case that:
   a time duration, during which the angle between the first body and the second body is kept at a first angle, is longer than a preset time threshold.

4. The electronic device according to claim 1, wherein the first instruction is an instruction generated in the case that:
   a first operation of a user is detected, wherein the first operation comprises an operation of changing a usage mode of the electronic device.

5. The electronic device according to claim 1, wherein the rotatable connection member comprises a rotation shaft, and the first using state and the second using state correspond to different diameters of the rotation shaft.

6. The electronic device according to claim 1, wherein in the case that the rotation shaft is made of a piezoelectric material, the first instruction is an instruction to change an intensity of electric field applied to the piezoelectric material.

7. The electronic device according to claim 1, wherein if an angle between the first body and the second body is kept fixed, the rotatable connection member is changed from the second using state to the first using state in the case that a second instruction is received.

8. The electronic device according to claim 7, wherein the second instruction is an instruction generated in the case that:
   a second operation of a user is detected, wherein the second operation comprises an operation of changing a usage mode of the electronic device; or
   a time duration during which the angle between the first body and the second body is kept at a second angle, is longer than a preset time threshold.

9. The electronic device according to claim 1, wherein the first body comprises a display unit, and the second body is configured to support the first body.

10. An information processing method, comprising:
    rotating, by a first body of an electronic device and at a first rotation damping, with respect to a second body of the electronic device in the case that a rotatable connection member which connects the first the body and the second body is in a first using state;
    changing the rotatable connection from the first using state to a second using state to keep a fixed angle between the first body and the second body, in the case that a first instruction is received during the first body rotating with respect to the second body;
    wherein a second rotation damping corresponding to the second using state is greater than the first rotation damping corresponding to the first using state.

11. The method according to claim 10, further comprising:
generating the first instruction in the case that:
- a rotation angle between the first body and the second body is greater than a predetermined angle; or
- a time duration, during which the angle between the first body and the second body is kept at a first angle, is longer than a preset time threshold; or
- a first operation of a user is detected, wherein the first operation comprises an operation of changing a usage mode of the electronic device.

12. The method according to claim 10, wherein the rotatable connection member comprises a rotation shaft, and the first using state and the second using state correspond to different diameters of the rotation shaft.

13. The method according to claim 12, wherein the rotation shaft is made of a piezoelectric material, and the method further comprises:
generating the first instruction in the case that a change of an intensity of electric field applied to the piezoelectric material is detected.

14. The method according to claim 10, wherein after keeping a fixed angle between the first body and the second body, the method further comprises:
changing the rotatable connection member from the second using state to the first using state in the case that a second instruction is received.

15. The method according to claim 14, further comprising:
generating a second instruction in the case that a second operation of a user is detected, wherein the second operation comprises an operation of changing a usage mode of the electronic device.

16. The method according to claim 14, further comprising:
generating a second instruction in the case that a time duration during which the angle between the first body and the second body is kept at a second angle, is longer than a preset time threshold.

17. The method according to claim 10, further comprising:
using the second body to support the first body on a surface, wherein the first body comprises a display unit.

* * * * *